United States Patent [19]

Garrett et al.

[11] 4,129,502

[45] Dec. 12, 1978

[54] LIQUID TREATMENT PROCESS

[76] Inventors: Michael E. Garrett, 92 York Rd., Woking, Surrey; Richard M. Keene, 27 Commonfield Rd., Banstead, Surrey, both of England

[21] Appl. No.: 775,627

[22] Filed: Mar. 8, 1977

[30] Foreign Application Priority Data

Mar. 12, 1976 [GB] United Kingdom ............... 10020/76
Apr. 20, 1976 [GB] United Kingdom ............... 15956/76

[51] Int. Cl.² ............................................. C02C 5/04
[52] U.S. Cl. .................................... 210/60; 210/63 R
[58] Field of Search ............... 210/15, 63 R, 48, 188, 210/197, 207, 208, 209, 220, 258, 539, 60; 261/DIG. 75

[56] References Cited

U.S. PATENT DOCUMENTS

| 3,152,982 | 10/1964 | Pagnotti | 210/197 |
| 3,371,033 | 2/1968 | Simmons et al. | 210/197 |
| 3,439,807 | 4/1969 | Danjer | 210/197 |
| 3,772,187 | 11/1973 | Othmer | 210/48 |
| 4,000,227 | 12/1976 | Garrett | 261/DIG. 75 |

*Primary Examiner*—Thomas G. Wyse
*Attorney, Agent, or Firm*—Dennison, Dennison, Meserole & Pollack

[57] ABSTRACT

Process for treating liquid. The liquid is contained in a vessel. A stream of liquid is passed under pressure through a line. Gas is introduced into the stream and downstream of the gas introduction point the stream passes downwardly through an expansion chamber in which its velocity is reduced in order to allow a prolonged gas/liquid contact. The pH of the liquid in the vessel is controlled to a value in a predetermined range.

11 Claims, 1 Drawing Figure

U.S. Patent  Dec. 12, 1978  4,129,502
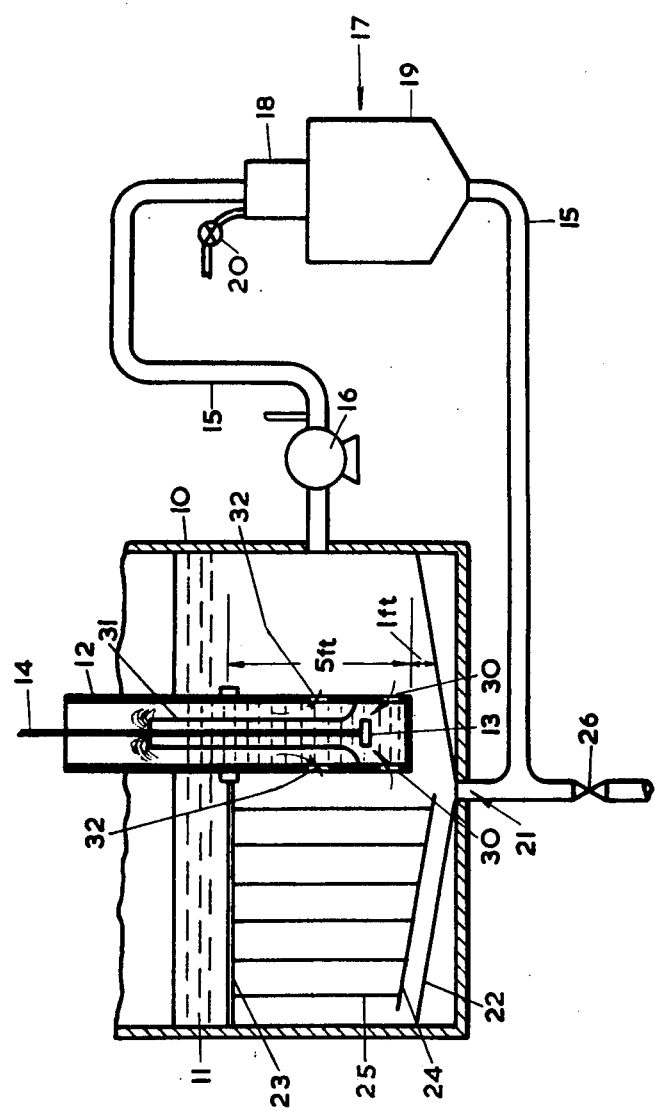

LIQUID TREATMENT PROCESS

FIELD OF THE INVENTION

This invention relates to a process for treating liquid by dissolving gas in the liquid, and particularly, but not exclusively, to dissolving an oxygen rich gas in the water, for example waste water having a biochemical demand.

BACKGROUND OF THE INVENTION

A disadvantage of many known sewage treatment systems is that several tanks are required for achieving not only an adequate dissolution of air or oxygen-rich gas in the waste material, but also separation of clarified liquor from a dense sludge of solid particles by allowing the sludge to form as a layer at the bottom of a separate settling tank. The overall treatment cycle of the sewage up to the stage of obtaining clarified liquor which can be safely discharged, takes a relatively long period of time in view of the fact that separate parts of the treatment cycle take place separately in different tanks.

Furthermore, a further disadvantage of such systems is that low pHs caused by high concentration of a dissolved gaseous component, such as carbon dioxide, can be detrimental to a treatment process of a liquid, typically aqueous waste material, and must be corrected by gas stripping, normally using air or an oxygen rich gas, to remove the unwanted dissolved gaseous component and/or by the addition of suitable buffering or neutralising chemicals, e.g. caustic soda.

SUMMARY OF THE INVENTION

The present invention provides a process for treating liquid, which process comprises passing the liquid into a container, passing a stream of the liquid under pressure through a conduit, introducing gas into the stream to form bubbles of gas in the liquid, passing the stream of liquid and gas bubbles downardly through an expansion chamber in which the velocity of the liquid stream is reduced to a value which allows a prolonged contact time between the gas and liquid while allowing the larger bubbles of gas to rise in the chamber, the stream being introduced into the chamber so as to create sufficient turbulence within the chamber to shatter some of the larger bubbles in the stream into relatively smaller bubbles, passing the stream containing liquid, dissolved gas and possibly relatively small bubbles of undissolved gas into a lower settling zone of the container, and controlling the pH of the liquid in the container to a value in a predetermined range, e.g. by stripping unwanted gases, such as carbon dioxide, from the liquid in the container, and/or by the addition of buffering or neutralising chemicals.

In operating, it is preferred that the aforesaid pH should be maintained at a value in the range 6.5 to 7.5 to promote good sludge settlement and nitrification.

The invention also provides apparatus for treating liquid, which apparatus comprises a container for the liquid, a liquid line leading into a lower settling zone of the container, means for passing liquid under pressure through the line, means for introducing gas to form bubbles in a liquid stream, in use, passing through the line, the line having downstream of the gas introduction means an expansion chamber through which the liquid passes, in use, in a downward direction and which is dimensioned to reduce the velocity of the stream thereby to allow a prolonged contact between the liquid and gas bubbles in the stream.

When a stripping gas is to be employed, the apparatus may further comprise a conduit extending into the container through an upper clarifying zone thereof and terminating in the lower settling zone of the container, means being provided to introduce a stripping gas into liquid, in use, within the conduit.

In the expansion chamber the velocity of the liquid is preferably such that only the very smallest bubbles are carried out of the bottom of the chamber. Larger bubbles, some of which may be formed by smaller bubbles which have coalesced in the chamber, rise in the chamber creating currents and therefore turbulence which results in many of the larger bubbles being shattered as well as the entrainment of gas from a pocket thereof which is established above the liquid in the chamber. Further turbulence is created by the impingement of the liquid in the chamber. Typically the downward velocity of the liquid stream through the expansion chamber is in the range 4 to 6 feet/sec in order to create sufficient turbulence to carry bubbles downwards and to shatter many of the larger bubbles. It is undesirable to increase the velocity to a value where none of the bubbles can rise since a reduced gas/liquid contact effect would then exist. In some embodiments of the invention, the expansion chamber comprises a cylindrical member having a constant cross-sectional area. A further chamber of larger cross-sectional area may be provided immediately below the expansion chamber to act as a disengagement zone in which a relatively calm, nonturbulent liquid zone exists below the relatively turbulent gas/liquid contact zone where shear forces reduce them once again to small bubbles.

It is preferred that the gas is introduced into the stream at a location adjacent a pump provided in the line upstream of the expansion chamber to provide a pressurised liquid flow through the line. The gas may be introduced directly into the volute of the pump. In this way the gas is introduced into a very turbulent zone of the liquid stream so that relatively small bubbles of gas are immediately present in the liquid stream.

It is also preferred that the liquid line leads to an inlet port provided in the bottom of the container and preferably centrally thereof. The bottom of the container preferably slopes downwards to such inlet port so that sludge tends to move under gravity towards the inlet port to be disturbed by the incoming liquid stream for further treatment. It is also preferred that a rotary scraper device is provided in the container for movement in the region of the bottom of container. Conveniently the scraper device may comprise an arm rotably mounted on the aforesaid conduit.

The flow of the liquid stream should be controlled to cause a disturbing effect of material only adjacent the bottom of the container, which constitutes a setting zone. The upper part of the container constitutes a relatively calm clarifying zone from which clarified liquor can be run off and safely discharged. Therefore it is possible to use a process and apparatus according to the invention to provide a total treatment plant in a single tank in which waste liquid can be treated and in which settling can take place so that clarified liquor is produced often without further settling in another process stage and in another treatment tank, being required. The provision of the aforesaid conduit and the means for introducing a stripping gas, e.g. oxygen, allows the stripping of carbon dioxide from the liquid in the container to take place without unduly disturbing the calm clarifying zone at the upper part of the container, the carbon dioxide passing to atmosphere within the confines of the conduit.

BRIEF DESCRIPTION OF THE DRAWING

A diagrammatic representation of an apparatus for treating waste water embodying the invention.

DETAILED DESCRIPTION

Referring to the drawing, the apparatus comprises a treatment tank 10, which is normally 6 to 12 feet deep and has a diameter in the range 3 feet to 60 feet. Sewage or other waste water 11 fills the tank. A vent conduit 12 is located in the tank and extends from above the liquid surface and terminates at a lower region of the tank above the bottom thereof. The conduit 12 has inlets 30 and inner duct 31 and outlets 32 at the lower end of the space between the conduit 12 and the duct 31. A diffuser 13 is located within the conduit 12 at a level below the inner duct 31 and is fed with an oxygen-enriched gas through line 14. The gas sparged into the liquid within the conduit 12 through diffuser 13 strips carbon dioxide from the liquid in the tank within and surrounding the conduit 12 in a lower settling zone of the tank. The carbon dioxide is released to atmosphere through the inner duct 31 so that the liquid in the tank is not unduly disturbed whereby the lower region of the tank is not stirred up to contaminate the clarified supernatant liquid at an upper clarifying zone of the tank. Liquid rising through the inner duct 31 spills over into the space between duct 31 and conduit 12 and out through outlets 32.

Carbon dioxide can be balanced with lime addition, e.g. carbon lime, so that in addition to using a stripping gas to control pH buffering or neutralising chemicals can be added to assist such control. In other embodiments, such control can be effected entirely by the addition of neutralising or buffering chemicals without the use of a stripping gas in which case conduit 12 and its associated equipment would be omitted.

A stream of liquid is withdrawn from the tank through a line 15 by a pump 16 and passed under a pressure, for example in the range 5 psig to 15 psig, to the upper end of a gas/liquid contactor 17. Oxygen-enriched air, for example having an oxygen content of at least 30, and preferably at least 90%, is introduced into the liquid stream in line 15 through line 28. The oxygen may be introduced from a pressurised source or it may be drawn in by a vacuum action provided by inserting a venturi in the line 15 at the point where line 28 joins line 15. This location is adjacent pump 16 so that the great turbulence created in the stream of liquid causes relatively small gas bubbles to be formed in the stream. It is also possible to inject the oxygen-rich gas directly into the pump volute. This gas is introduced at a rate to provide a quantity of gas in the liquid stream in the range 2 ppm to 10 ppm.

The contactor device 17 comprises an upper cylindrical portion 18 and a lower larger diameter cylindrical portion 19. The flow of liquid in the portion 18 is determined by the velocity of the incoming stream and the diameter of the portion and is preferably in the range 4 to 6 feet/second, for example 5 feet/sec., whereby the larger bubbles of gas. e.g. about ¼ in. diameter, can rise through the liquid to form a gas pocket at the upper end of portion 18. The smaller bubbles, e.g. about 1/16 in. diameter, tend to remain below the surface in the liquid in portion 18. The rising bubbles thus increase in cross-sectional area of the contactor device 17 and create currents that cause turbulence in the liquid. This turbulence is increased by making the incoming stream impinge on the surface of the liquid in portion 18. This turbulence creates shearing forces which shatter many of the larger bubbles into smaller bubbles to provide a prolonged gas/liquid contact in this zone.

A valved vent line 20 leads from the upper end of the portion 18 to allow for removal of carbon dioxide rich gas if a gas pocket forms above the liquid.

The cylindrical portion 19 provides a relatively calm disengagement zone into which the smallest bubbles in the liquid stream, pass and most are retained in that portion to coalesce and form larger bubbles which rise into the turbulent zone in portion 18.

A liquid stream containing dissolved oxygen rich gas, about 8 ppm, and some of the smallest bubbles of undissolved gas passes through a further portion of line 15 into the tank 10 through a further port located centrally in the bottom of the tank 10.

The tank is provided with a conical base 22 which slopes downwards towards port 21 to allow deposits to pass under gravity to the port to be disturbed and mixed by the incoming stream. This stirring effect, which is confined to a lower settling zone of the tank, is enhanced by a stirrer device comprising an arm 23 rotatable about conduit 12 having a stirring blade 24 suspended from the arm by chains 25. Clarified liquor is discharged from an upper relatively calm clarifying zone of the tank which liquor is often safe for discharging without further treatment or separation being required. Surplus sludge can be periodically discharged via valve 26. In other embodiments waste water to be treated may be conveniently fed into the suction of pump 16.

What is claimed is:

1. A process for treating liquid, which process comprises passing a stream of the liquid under pressure through a line, introducing gas into the stream to form bubbles of gas in the liquid, passing the stream of liquid and gas bubbles downwardly through an expansion chamber in which the velocity of the liquid stream is reduced to a value which allows a prolonged contact time between the gas and liquid while allowing the larger bubbles of gas to rise in the chamber, the stream being introduced into the chamber so as to create sufficient turbulence within the chamber to shatter some of the larger bubbles in the stream into relatively smaller bubbles, passing the stream containing liquid, dissolved gas and possibly relatively small bubbles of undissolved gas into a lower settling zone of a container for the liquid, said expansion chamber being located outside said container, and controlling the pH of the liquid in the container to a value in a predetermined range by injecting a stripping gas to strip unwanted gases from the liquid in the container.

2. A process as claimed in claim 1 wherein the pH control is assisted by the addition of buffering or neutralising chemicals.

3. A process as claimed in claim 1 wherein the aforesaid pH is maintained at a value in the range 6.5 to 7.5.

4. A process as claimed in claim 1 wherein unwanted gases are stripped from the liquid in the container, by injecting the stripping gas within the confines of a conduit which extends into the liquid, to a position in the lower settling zone, through which conduit said unwanted gases are passed to atmosphere without unduly disturbing the main body of liquid in the container.

5. A process as claimed in claim 1 wherein in the expansion chamber, the velocity of the liquid is maintained at a value at which only the very smallest bubbles are carried out at the bottom of the chamber.

6. A process as claimed in claim 1 wherein the liquid stream entering the chamber is caused to impinge on the surface of the liquid in the chamber.

7. A process as claimed in claim 1 wherein the downward velocity of the liquid stream through the expansion chamber is in the range 4 to 6 feet/sec.

8. A process as claimed in claim 1 wherein a gas pocket which forms at the top of the expansion chamber is vented from time to time to remove carbon dioxide or other gas such as nitrogen stripped from the liquid in the chamber.

9. A process as claimed in claim 1 wherein the gas is introduced into the stream at a location at or adjacent a pump provided in the line upstream of the expansion chamber to provide a pressurised liquid flow through the line.

10. A process as claimed in claim 9 wherein the gas is introduced directly into the volute of the pump.

11. A process as claimed in claim 1 wherein the liquid line comprises liquid withdrawn directly from the container.

* * * * *